United States Patent [19]

Fukushima et al.

[11] 4,418,802

[45] Dec. 6, 1983

[54] SHOCK ABSORBER

[75] Inventors: Naoto Fukushima, Fujisawa; Kazuroh Iwata, Kamakura; Kunihiko Hidaka, Yokohama, all of Japan

[73] Assignee: Nissan Motor Co., Ltd., Yokohama, Japan

[21] Appl. No.: 285,049

[22] Filed: Jul. 20, 1981

[30] Foreign Application Priority Data

Aug. 7, 1980 [JP] Japan ................................ 55-108965

[51] Int. Cl.³ .............................................. F16F 9/34
[52] U.S. Cl. ................................. 188/282; 188/322.15
[58] Field of Search ............... 188/269, 282, 316, 317, 188/320, 322.13, 322.15

[56] References Cited

U.S. PATENT DOCUMENTS

| 3,133,615 | 5/1964 | Edman et al. |
| 3,220,517 | 11/1965 | Lorenz. |
| 3,365,033 | 1/1968 | Willich ............................ 188/322.15 |
| 3,672,474 | 6/1972 | Mayer et al. |
| 4,082,169 | 4/1978 | Bowles. |
| 4,287,970 | 9/1981 | Eusemann et al. ................... 188/269 |

FOREIGN PATENT DOCUMENTS

| 697799 | 10/1940 | Fed. Rep. of Germany. |
| 845638 | 8/1939 | France. |
| 892773 | 5/1944 | France. |
| 993852 | 7/1951 | France ..................... 188/320 |
| 600386 | 4/1948 | United Kingdom. |
| 1067196 | 5/1967 | United Kingdom. |
| 2044882 | 10/1980 | United Kingdom. |
| 2065268 | 6/1981 | United Kingdom. |

Primary Examiner—Duane A. Reger
Attorney, Agent, or Firm—Schwartz, Jeffery, Schwaab, Mack, Blumenthal & Koch

[57] ABSTRACT

A hydraulic shock absorber including a piston disposed within a hollow cylinder in movable position responsive to a shock applied thereto, the piston defining a hollow vortex chamber therein, the vortex chamber being communicated with fluid chambers defined in the hollow cylinder to introduce a working fluid and to generate a vortex therein for producing an absorbing force, wherein the vortex chamber being so sized as $$1 \leq (h \cdot Sv/So) \leq 6$$

where:
h is a depth of the vortex chamber;
Sv is sectional area of the vortex chamber;
So is effective sectional area of the piston effecting for the fluid to increase or decrease the pressure thereof.

7 Claims, 8 Drawing Figures

SHOCK ABSORBER

BACKGROUND OF THE INVENTION

The present invention relates generally to a hydraulic shock absorber for an automotive vehicle suspension. More specifically, the invention relates to a shock absorber having a vortex chamber in a piston, in which the dimensions of the piston are such that it maximizes the absorbing force created by the vortex therein in response to the substantially unstable vehicle driving conditions and minimize the absorbing force in stable driving conditions.

Conventionally, it has been well known to use a shock absorber having a vortex valve in the piston thereof. Generally, in a shock absorber with a vortex valve, the vortex in the vortex chamber in the piston is generated corresponding to the flow amount of the working fluid. The vortex generated in the vortex chamber limits the fluid flow between the upper and lower fluid chambers defined in the absorber housing and separated by the piston.

Since such a vortex valve shock absorber produces the absorbing force against the shock mainly depending on the piston stroke and not depending substantially on the motion speed of the piston, the absorbing force can be reduced in a range where the piston stroke is relatively small and therefore a significant absorbing force is not required. This ensures a comfortable ride.

However, in spite of the above-mentioned advantages which are expected from such a vortex valve shock absorber, a shock absorber which is capable of sufficiently varying the absorbing force substantially corresponding to the requirement according to the vehicle driving condition has not been achieved.

SUMMARY OF THE INVENTION

Therefore, it is an object of the present invention to provide a shock absorber with a vortex valve in a piston, wherein the piston and the vortex chamber therein are related dimensionally such that the absorbing force created by the vortex in the vortex chamber can be maximized when the vehicle driving conditions are relatively unstable and minimized in stable driving conditions.

To accomplish the above-mentioned and other objects of the invention, the shock absorber is provided with a piston having a vortex valve, in which the piston is designed according to the relationship represented by:

$$1\ mm \leq (h \cdot Sv)/(So) \leq 6\ mm$$

where
- So is the cross-sectional area of the piston varying the relative volume of fluid chambers defined in the shock absorber to vary the relative pressure of the working fluid in the fluid chambers;
- Sv is the cross-sectional area of the vortex chamber; and
- h: depth of the vortex chamber.

BRIEF DESCRIPTION OF THE DRAWINGS

The present invention will become more fully understood from the detailed description given herebelow and from the accompanying drawings of a preferred embodiment of the present invention, which, however, should not be taken as limitative of the invention but for elucidation and explanation only.

In the drawings.

DESCRIPTION OF THE PREFERRED EMBODIMENT

Figure 1:
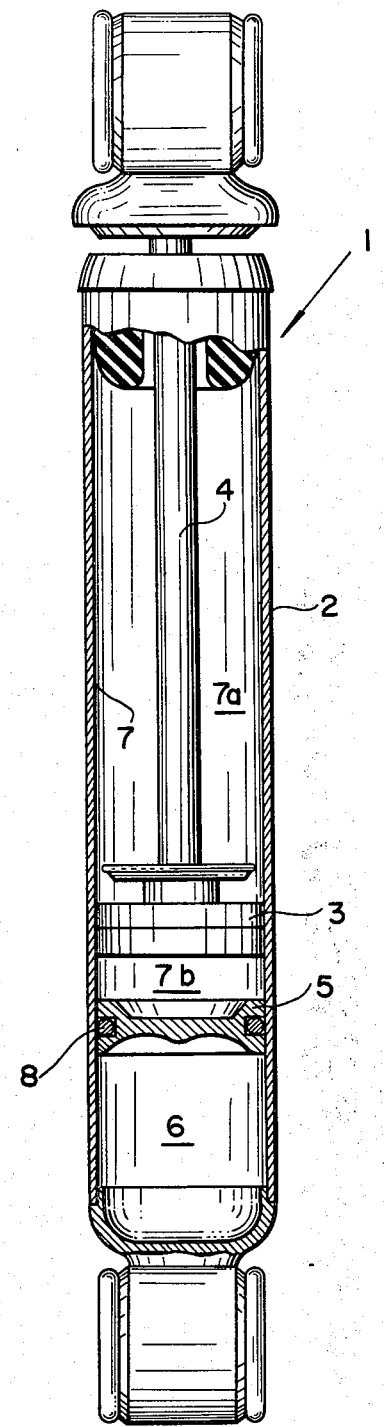
FIG. 1 is a longitudinal section of a preferred embodiment of a shock absorber according to the present invention.
Figure 2:
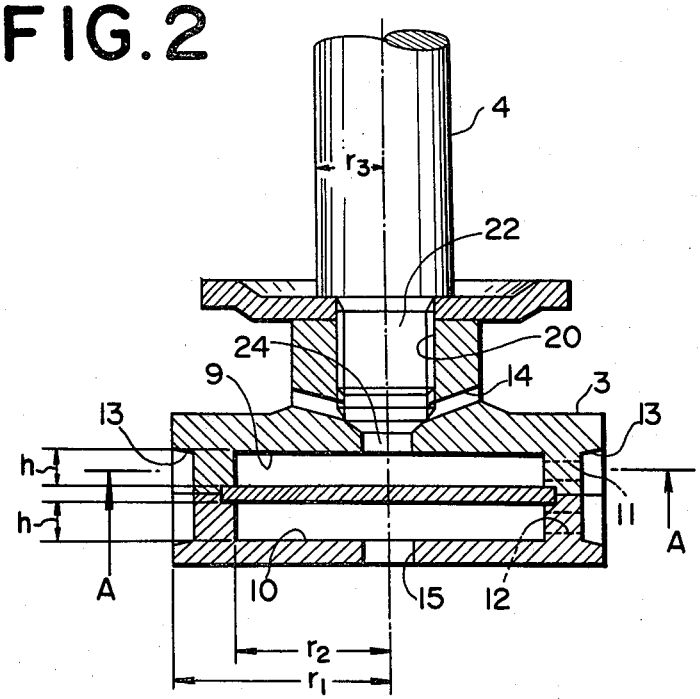
FIG. 2 is an enlarged section of a piston used in the shock absorber of FIG. 1.
Figure 3:
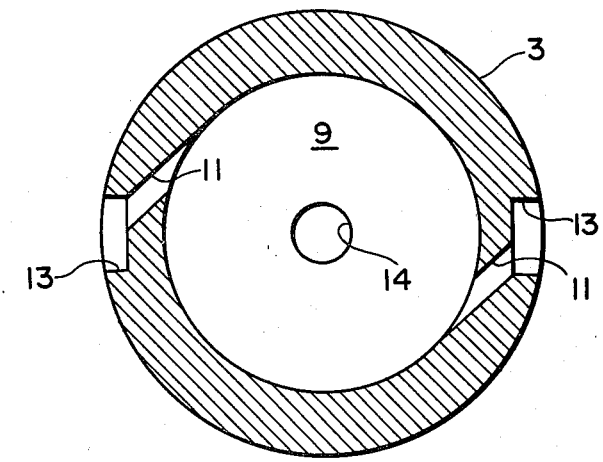
FIG. 3 is an enlarged transverse section of the piston taken along line A—A of FIG. 2.

Referring now to the drawings, particularly to FIGS. 1, 2 and 3, there is illustrated a preferred embodiment of a shock absorber 1 in accordance with the present invention. The shock absorber comprises a cylindrical tube 2 and a piston 3 movably disposed within the cylinder tube 2 along the longitudinal axis of the cylinder tube. The piston 3 is secured on the lower end of a piston rod 4 which has an upper end extending from the tube 2 and attached to a vehicle body chassis (not shown). On the other hand, the lower end of the tube 2 is attached to a wheel axle (not shown). A free piston 5 with an annular sealing ring 8 is also disposed within the tube 2 to define therein a pneumatic chamber 6. A chamber 7 defined above the free piston 5 is filled with a working fluid. The chamber 7 is divided into the upper and lower chamber 7a and 7b by the piston 3.

As shown in FIGS. 2 and 3, the piston 3 is formed with a pair of vortex chambers 9 and 10 respectively of circular transverse section. Also, the piston 3 is formed with a recess 13 on the outer circumference. The upper vortex chamber 9 communicates with the recess 13 via fluid passages 11, each of which has an outer end opening into the recess 13 and an inner end opening into the upper vortex chamber 9 in the direction substantially along the normal of the circle of the upper vortex chamber 9. Likewise, the lower vortex chamber 10 communicates with the recess 13 via fluid passages 12. Each of the fluid passages has an outer end opening into the recess 13 and an inner end opening to the lower vortex in the direction perpendicular to the longitudinal axis of the lower vortex chamber. Thus, the upper and lower vortex chambers 9 and 10 communicate with one another via the fluid passage 11, the recess 13 and the fluid passage 12.

The upper vortex chamber 9 also communicates with the upper chamber 7a via fluid passages 14 radially extending from a threaded opening 20 for engagement with the threaded end 22 of the piston rod, and an opening 24 for communication between the threaded opening 20 and the upper vortex chamber 9. On the other hand, the lower vortex chamber 10 communicates with the lower chamber 7b via an opening 15 formed in the bottom of the lower vortex chamber.

In operation, if the vehicle is subject to road shock, a suspension spring of a vehicle suspension mechanism is displaced to absorb the shock. The vehicle will move up and down due to displacement of the suspension spring until the spring returns to the normal state. At this time, the shock absorber works to reduce the vehicle vibration by absorbing the shock.

In the compression stroke of the piston 3, the piston 3 travels downwardly to expand the volume of the upper chamber 7a and, in turn, reduce the volume of the lower chamber 7b. Corresponding to the piston stroke, the fluid pressure in the upper chamber 7a is reduced and the fluid pressure in the lower chamber 7b is increased to create a pressure difference between the upper and lower chambers 7a and 7b. As a result, the fluid in the lower chamber 7b flows into the upper chamber 7a via the piston 3. The fluid in the chamber 7b enters the lower vortex chamber 10 through the opening 15. The fluid flows via the lower vortex chamber 10, the fluid passages 12, the recess 13 and the fluid passage 11 into the upper vortex chamber 9. From the fluid passage 11, the fluid is discharged into the upper chamber 7a in the direction substantially along the normal of the circle of the upper vortex chamber in order to produce a vortex therein. Thereafter, the fluid flows into the upper chamber 7a via the opening 24 and the passages 14. At the same time, the fluid passages 11 and 12 serve as orifices to limit the flow amount of the fluid. In the compression stroke, therefore, the shock absorber 1 absorbs the shock applied to the vehicle by the vortex-and-orifice effect, both serving to limit the fluid flow.

Likewise, in the expansion stroke of the piston 3, the volume of the upper chamber 7a is reduced and the volume of the lower chamber 7b is increased to induce fluid flow via the piston 3. During the fluid flow through the vortex chambers 9 and 10, the vortex is produced in the lower vortex chamber 10 in order to generate the shock absorbing force.

Here, with respect to the dimensional relationship of the piston, the effective area So(mm²), which serves to vary the relative volume of the upper and lower chambers 7a and 7b, and the horizontal cross-sectional area Sv(mm²) of the upper and lower vortex chambers 9 and 10 can be obtained from the following equations respectively:

$$So = r_1^2 \cdot \pi - r_3^2 \cdot \pi \quad (1)$$

$$Sv = r_2^2 \cdot \pi \quad (2)$$

In the preferred embodiment, the dimensions of piston 3 are such that the relationship between the effective area So and the horizontal cross-sectional area Sv of the vortex chambers 9 and 10 can be represented by:

$$1 \text{ mm} \leq (h \cdot Sv/So) \leq 6 \text{ (mm)} \quad (3)$$

It should be noted that the above-specified dimensional relationship can be applied to any hydraulic shock absorber absorbing the shock by generating the vortex. Therefore, in turn, the specific construction of the shock absorber gives no limitation to the present invention in any way. Furthermore, it should be noted that the present invention is designed in accordance with the dimensional relationship of the areas serving to vary the volume of the chambers 7a and 7b and serving to generate a vortex in the vortex chambers 9 and 10.

Figure 4:
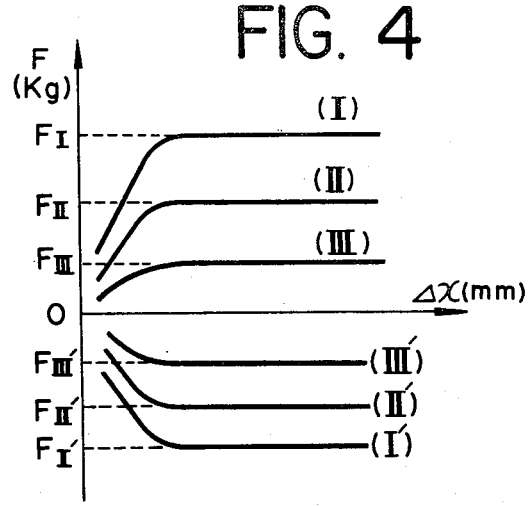
FIG. 4 is a graph showing the relationship between the absorbing force F and the piston stroke $\Delta x$, wherein the area above the horizontal axis shows variation of the absorbing force corresponding to the compression stroke of the piston and the area below the horizontal axis shows the relation between the absorbing force and the piston stroke in the expansion stroke, and wherein $F_I$, $F_{II}$, $F_{III}$, $F_{I'}$, $F_{II'}$, and $F_{III'}$ respectively show variation of the absorbing force with respect to the piston stroke at various piston speeds.

Now, we refer to FIGS. 4 to 8 and explain in greater detail the present invention with reference to those figures. FIG. 4 shows the relationship between the absorbing force F and the piston stroke $\Delta x$. In FIG. 4, lines I, II, III, I', II' and III' respectively represent variation of the absorbing force F with respect to the piston stroke $\Delta x$ at different motion speeds of the piston 3. The lines I, II and III respectively represent variation of the absorbing force F in the expansion stroke of the piston 3 and in respectively different motion speeds I>II>III. On the other hand, the lines I', II' and III' respectively represent variation of the absorbing force F in the compression stroke and in respectively different motion speeds I'>I'>III.

As seen from FIG. 4, the absorbing force F is proportional to the piston stroke $\Delta x$. However, if the piston stroke $\Delta x$ exceeds a given value, the absorbing force F becomes substantially constant. In this range, the absorption of the shock effected by the vortex in the vortex chambers 9 and 10 is at its maximum value. The maximum absorbing force F is varied depending on the speed of the piston, as represented by $F_I$, $F_{II}$, $F_{III}$, $F_{I'}$, $F_{II'}$, and $F_{III'}$.

Figure 5:
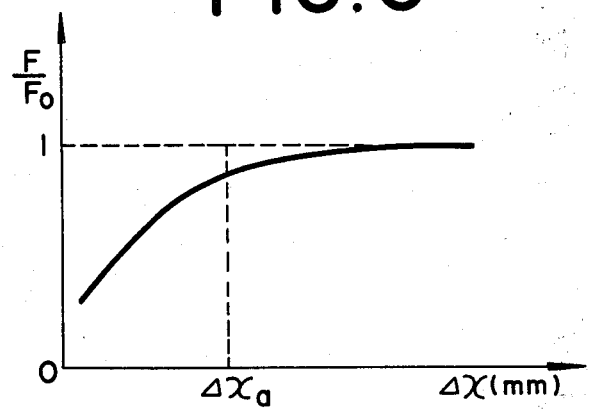
FIG. 5 is a graph showing variation of ratio $F/F_o$ of the absorbing force to the maximum absorbing force with respect to the piston stroke $\Delta x$.

The relationship between the absorbing force F and the piston stroke, neglecting the influence of the piston motion speed, can be illustrated as shown in FIG. 5. In FIG. 5, F/Fo represents relative ratio of the absorbing force to the maximum absorbing force $F_I$, $F_{II}$, $F_{III}$, $F_{I'}$, $F_{II'}$, and $F_{III'}$. The piston stroke $\Delta xa$ denoted in FIG. 5 represents the point where the ratio F/Fo becomes approximately 1. Stroke $\Delta xa$ can determined by experiment. Within the range where the piston stroke $\Delta x$ is equal to or smaller than $\Delta xa$, the vortex is not induced or is insufficiently induced to limit the fluid flow in the vortex chambers 9 and 10. Therefore, the relative ratio is increased mainly depending on the piston stroke $\Delta x$.

Alternatively, however FIG. 5 shows the relationship between the relative ratio of the absorbing force F/Fo and the piston stroke $\Delta x$ in the specific construction of the piston as illustrated above. The relationship shown in FIG. 5 can be varied according to the dimensional relationship of the effective area So, the cross-sectional area Sv of the vortex chamber 9 and 10, and the depth h of the vortex chamber.

Here, the absorbing force is determined by the amount of the working fluid flowing through one of the vortex chambers 9 or 10 in which a vortex is generated. In other words, the absorbing force depends on the flow amount of the fluid flowing through an unit volume in the vortex chamber, this fluid being hereafter referred as "flow rate $\alpha$". The fluid flow rate $\alpha$ can be obtained by the following equation:

$$\alpha = (So \cdot \alpha x/(Sv \cdot h)$$

Figure 6:
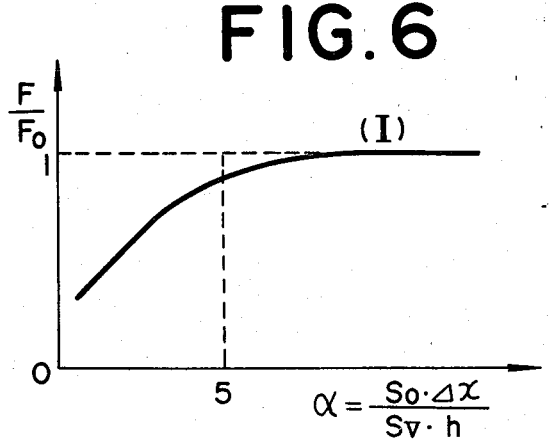
FIG. 6 is a graph showing variation of ratio $F/F_o$ of the absorbing force to the maximum absorbing force with respect to an amount of the working fluid $\alpha$ flowing in the piston vortex chamber.

FIG. 6 shows the relationship between the ratio F/Fo of the absorbing force and the fluid flow rate $\alpha$ (=So- ·Δx/Sv·h). As seen in FIG. 6, in the range where the fluid flow rate Δ is smaller than a given value, for example, 5, the absorbing force varies directly with the piston stroke Δx.

It should be understood that the given value of the fluid flow rate α varies according to the construction of the piston and, therefore, the numerical specification in FIG. 6 merely shows one example of the given value of the fluid flow rate.

Figure 7:
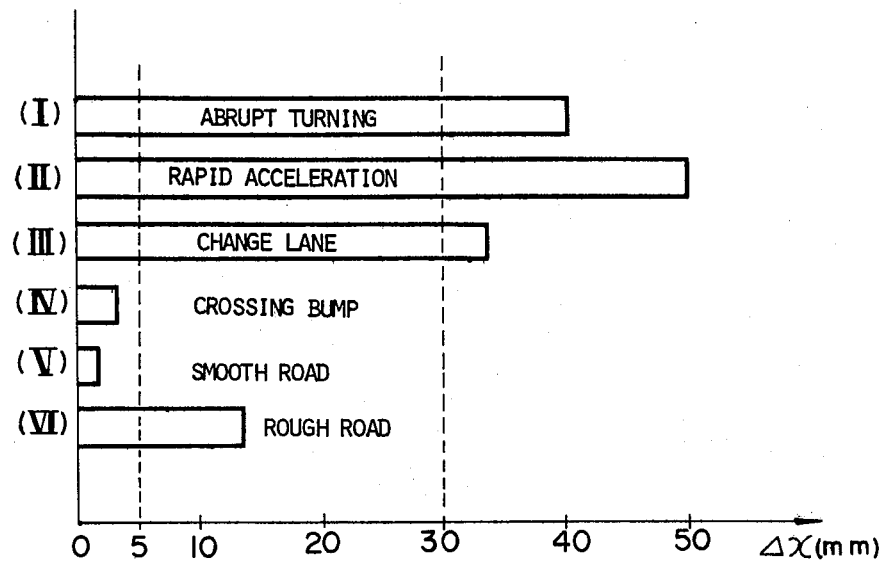
FIG. 7 illustrates required absorbing forces in various driving conditions; (I) abrupt turning, (II) rapid acceleration, (III) lane change, (IV) crossing a bump, (V) on a smooth road, and (VI) on a rough road.

Referring to FIG. 7, there is illustrated a histogram showing the characteristic piston stroke Δx corresponding to various vehicle driving conditions. In FIG. 7, the line I represents a characteristic piston stroke Δx when the vehicle turns abruptly. In this driving condition, the piston stroke Δx is approximately 40 mm. Similarly, the line II represents the piston stroke Δx, being approximate 50 mm, in response to rapid acceleration of the vehicle. The line III represents the piston stroke Δx, being approximate 35 mm, due to a lane change. The line IV represents the piston stroke Δx, about 3 mm, when the vehicle is driven over a slight bump in the road. The line V represents the piston stroke Δx, about 2 mm, on a substantially smooth road. The line VI represents the piston stroke Δx, about 14 mm, on a substantially rough road.

As understood from FIG. 7, when the vehicle is turned abruptly, rapidly accelerated, or changes lanes, a significant absorbing force is required for adequate driving stability. On the other hand, when the vehicle is driven over a slight bump, on a smooth road, or on a relatively rough road, a significant absorbing force is not required since the vehicle is easily maintained in a stable condition. In the latter driving condition, it is important to provide minimal absorbing force for riding comfort. As understood herefrom, if the piston size is such that given piston stroke Δxa can be set in the range 5 mm ≦ Δxa ≦ 30 mm, it can be expected that both driving stability and riding comfort can be achieved.

Figure 8:
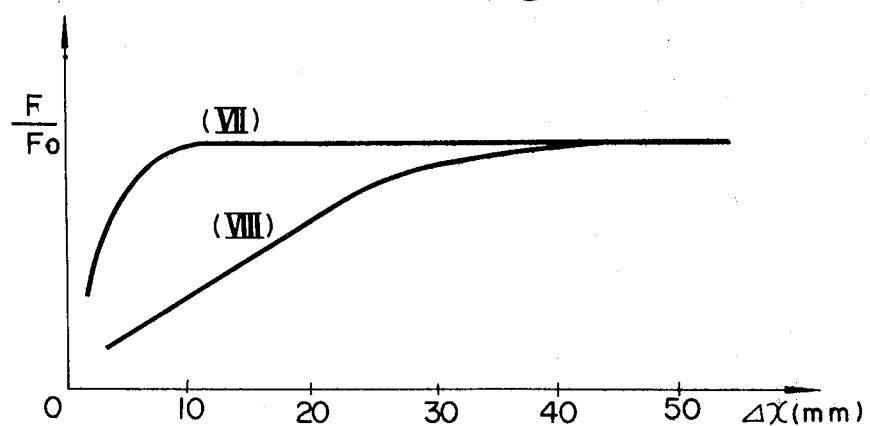
FIG. 8 is a graph showing variation of the ratio $F/F_o$ of the absorbing force to the maximum absorbing force with respect to the piston stroke $\Delta x$.

FIG. 8 shows a graph showing the relationship between the relative ratio F/Fo of the absorbing force and the piston stroke Δx in the cases of the piston design being such that h·Sv/So equals 1 mm (line VII) or 6 mm (line VIII). As seen from FIG. 8, if the piston is designed so as to make h·Sv/So=1 mm, the given piston stroke Δxa becomes about 5 mm and on the other hand, if the piston is designed so as to make h·Sv/So=6 mm, the given piston stroke Δxa becomes about 30 mm. Therefore, for achieving both driving stability and riding comfort, it is necessary to design the piston to conform to the relationship between the effective area So, the vortex chamber cross-sectional area Sv, and the vortex chamber depth h as follows:

$$1 \leq (Sv \cdot h / So \leq 6 \text{ mm}$$

Thus, the present invention fulfills all of the objects and advantages sought thereof.

What is claimed is:

1. A hydraulic shock absorber including a piston disposed within a hollow cylinder in movable position responsive to a shock applied thereto, said piston defining a hollow vortex chamber therein, said vortex chamber being communicated with fluid chambers defined in the hollow cylinder to introduce a working fluid and to generate a vortex-type fluid flow therein for producing an absorbing force, wherein the vortex chamber is sized to satisfy the specific relationship $$1 \leq h \cdot Sv/So \leq 6$$

where:
h is the depth of the vortex chamber;
Sv is the cross-sectional area of the vortex chamber; and
So is the effective cross-sectional area of the piston acting on the fluid to increase or decrease the pressure thereof.

2. A shock absorber as set forth in claim 1, wherein said piston defines two vortex chambers therein, said vortex chambers communicating with one another and having depths and cross-sectional areas related to the effective area of the piston in said specific relationship.

3. A shock absorber as set forth in claims 1 or 2, wherein said cylinder further includes a pneumatic chamber filled with a gas, the volume of said pneumatic chamber being variable so that it can absorb variation in fluid pressure caused by varying of the displacement of the piston rod.

4. A hydraulic shock absorber for an automotive vehicle suspension for damping relative displacement of the vehicle body and vehicle wheel, comprising:
a hollow cylinder defining therein a fluid chamber filled with a working fluid;
a piston disposed within said fluid chamber and dividing said fluid chamber into upper and lower sections, said piston being movable along the longitudinal axis of said cylinder in response to the shock applied to the shock absorber;
a piston rod connecting said piston to said vehicle body; and
a vortex chamber defined within said piston and communicated with said upper and lower sections of the fluid chamber, said vortex chamber having a sectional area and a depth satisfying the following equation:

$$1 \leq \frac{h \cdot r_2^2 \cdot \pi}{r_1^2 \cdot \pi - r_3^2 \cdot \pi} \leq 6$$

in which
$r_1$ is the external radius of the piston;
$r_2$ is the radius of the vortex chamber; and
$r_3$ is the radius of a piston rod.

5. A hydraulic shock absorber for an automotive vehicle suspension for damping relative displacement between the vehicle body and the vehicle wheel, comprising:
a hollow cylinder defining a fluid chamber filled with a working fluid;
a piston disposed within said fluid chamber and dividing said fluid chamber into upper and lower sections, said piston being movable along the longitudinal axis of said cylinder in response to the load applied to said vehicle body and/or vehicle wheel;
an upper vortex chamber defined in said piston and adapted to create vortex-fashion fluid flow in the piston compression stroke;
a lower vortex chamber defined in said piston and adapted to create vortex-fashion fluid flow in the piston expansion stroke;
a piston rod connecting said piston to said vehicle body; and each of said vortex chambers having a sectional area and a depth so as to satisfy the following equation:

$$1 \leq \frac{h \cdot r_2^2 \cdot \pi}{r_1^2 \cdot \pi - r_3^2 \cdot \pi} \leq 6$$

in which
$r_1$ is the external radius of the piston;
$r_2$ is the radius of the vortex chamber; and
$r_3$ is the radius of a piston rod.

6. A shock absorber as set forth in claim 5, wherein said upper and lower vortex chambers respectively communicated with said upper and lower sections of the fluid chamber, said piston further defines a fluid passage extending along the circumferencial periphery thereof and a vortex passage having an inner end opening toward one of said vortex chambers in the direction substantially along the normal of the circle of the vortex chamber and the outer end opening toward the fluid passage, said fluid passage and the vortex passage establishing communication between said upper and lower vortex chambers.

7. A shock absorber as set forth in claim 6, wherein said cylinder further defines therein a pneumatic chamber filled with a gas, the volume of said pneumatic chamber being variable corresponding to the displacement of the piston rod.

* * * * *